G. W. MOORE.
VENTS FOR BARRELS, &c.
No. 187,478. Patented Feb. 20, 1877.
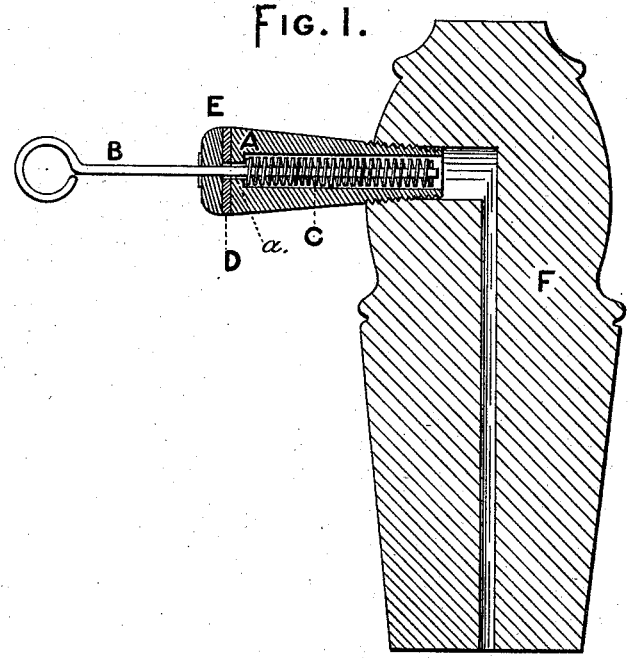
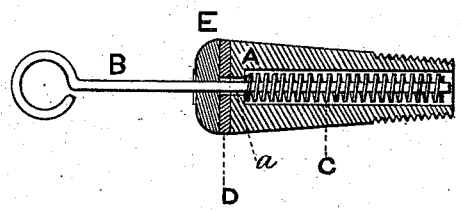
WITNESSES.          INVENTOR.

UNITED STATES PATENT OFFICE.

GEORGE W. MOORE, OF AUBURN, NEW YORK, ASSIGNOR TO MARY MOORE, OF SAME PLACE.

IMPROVEMENT IN VENTS FOR BARRELS, &c.

Specification forming part of Letters Patent No. 187,478, dated February 20, 1877; application filed December 29, 1876.

*To all whom it may concern:*

Be it known that I, GEORGE W. MOORE, of Auburn, in the county of Cayuga and State of New York, have invented a new and useful Improvement in Barrel or Beer-Keg Vents.

The invention or improvement is fully set forth in the following specification and drawing, in which—

Figure 1 is a sectional view of my improvement attached to a lager-beer keg plug; and Fig. 2 is a sectional view of my invention detached from the keg-plug.

The object of my invention is to keep and preserve lager-beer, ale, cider, or any other liquids which become insipid by the admission of air, especially while on draft.

In the drawing, A is a metal shell or tube provided with screw-thread, as shown, and small orifice $a$. B is a rod or bar, to which is permanently attached the collar or washer E.

C is a spiral spring passing over rod B. D is a rubber packing between collar E and tube A. The purpose of the washer E and rubber packing D, in the operation of my device, is to prevent the escape of gases from the barrel or keg when not being drawn from, and to which vent may quickly be given by simply pulling out the rod or bar B, air then being admitted in sufficient quantity to the barrel or keg through the small orifice $a$.

I claim as my invention—

The rod or bar B, with the fixed collar E, the washer D, the spring C, and the shell or tube A, with orifice $a$, the whole combined as shown, and constructed substantially for the purpose specified and set forth.

GEO. W. MOORE.

Witnesses:
 WILLIAM MOORE,
 E. W. VAN ALSTINE.